United States Patent [19]
Voss

[11] Patent Number: 6,020,011
[45] Date of Patent: Feb. 1, 2000

[54] ANAEROBICALLY-PACKAGED READY TO USE LIQUID BAKERY WASH

[75] Inventor: Gordon D. Voss, Cincinnati, Ohio

[73] Assignee: Baker's Bright, Inc., Cincinnati, Ohio

[21] Appl. No.: 09/136,167

[22] Filed: Mar. 19, 1998

Related U.S. Application Data

[63] Continuation-in-part of application No. 08/837,924, Apr. 11, 1997, abandoned.

[51] Int. Cl.[7] ........................................................ A23L 3/34
[52] U.S. Cl. .......................... 426/116; 426/293; 426/302; 426/532; 426/654; 426/656
[58] Field of Search ..................................... 426/116, 302, 426/293, 310, 532, 541, 544, 653, 654, 656, 442, 391

[56] References Cited

U.S. PATENT DOCUMENTS

| | | | |
|---|---|---|---|
| 3,655,404 | 4/1972 | Glasser et al. | 99/92 |
| 4,115,592 | 9/1978 | Bergquist et al. | 426/302 X |
| 4,276,311 | 6/1981 | Burrows et al. | 426/56 |
| 4,446,164 | 5/1984 | Brog | 426/583 |
| 4,504,502 | 3/1985 | Earle et al. | 426/293 |
| 4,645,674 | 2/1987 | Lang et al. | 426/94 |
| 4,863,751 | 9/1989 | Voss | 426/532 |
| 5,128,161 | 7/1992 | Smith | 426/116 X |

FOREIGN PATENT DOCUMENTS

98/46084  10/1998  WIPO.

OTHER PUBLICATIONS

The Wiley Encyclopedia of Packaging Technology, John Wiley & Son., pp. 218–221, 1986.

Winter, A Consumer's Dictionary of Food Additives, Crown Publishers Inc., N.Y. (1994)—pp. 98, 114 and 360.

*Primary Examiner*—Milton Cano
*Attorney, Agent, or Firm*—Frost & Jacobs LLP

[57] ABSTRACT

The present invention relates to a liquid, shelf stable ready to use baker's wash for coating bakery products such as rolls, breads and pie crusts. The wash can be applied either before or after baking to provide a shine to the bakery product. The composition is packaged in an anaerobic environment, such as an aerosol spray. The product provides a convenient way of dispensing the product in use, while maintaining the antimicrobial stability of the product over its useful life. This result is achieved using a preservative composition which contains a mixture of methylparaben and propylparaben, wherein the ratio by weight of the materials is at least about 1.25:1. The composition comprises at least one non-egg white protein, such as a caseinate, at least one anti-precipitive agent, at least one viscosity control stabilizer, the preservative composition described above, and water.

22 Claims, No Drawings

ANAEROBICALLY-PACKAGED READY TO USE LIQUID BAKERY WASH

This is a continuation-in-part of U.S. patent application Ser. No. 08/837,924, filed Apr. 11, 1997 now abandoned.

BACKGROUND OF THE INVENTION

The present invention relates to a liquid, shelf stable, ready to use baker's wash for coating bakery products such as rolls, breads or pie crusts. The wash is anaerobically packaged, such as in an aerosol container, and can be applied either before or after baking to provide a shine to bakery products.

Dry powder-type baker's washes are well known in the art. Early baker's washes consisted primarily of dried egg white and other ingredients, for example an agent to help the dried egg white dissolve in water. A typical prior art dried egg white baker's wash is disclosed in U.S. Pat. No. 4,115,592, Bergquist, et al., issued Sep. 19, 1978. The Bergquist, et al. patent discloses a process for preparing dried egg white having improved flow and water solubility characteristics. The process produces a powder comprised primarily of dried egg white and sugar. When it is desired to use the powdered composition on bakery goods, the powder is dissolved in water and applied by spraying, brushing or the like.

Egg white washes, like that of Bergquist, et al., are not shelf stable. Once the egg white powder is dissolved in the water, it has to be used within about 8 hours. After one day, the microorganism growth in the composition becomes prohibitively high such that the wash can no longer be employed on bakery goods. For this reason, it is necessary to make a fresh wash mixture every day. Since the liquid wash is a good medium for microorganism growth, manufacturers of egg white washes supplied bakeries with the product in a powder form which has a longer shelf life. However, contamination of the dry egg white powder often occurs since the powder is capable of supporting microorganism growth, especially in humid conditions, the egg white powder being very hydrophilic. Making a wash composition with contaminated egg white powder accelerates microorganism growth so that the wash quickly becomes unusable or, at best, the application lifetime of the wash is greatly reduced.

In response to widespread abuses by bakeries, health departments of various states outlawed baker's washes which employed egg white. Southern states having warm moist climates, such as Louisiana, have been particularly concerned with microorganism growth on food products. As a result, the southern states were generally the first ones to outlaw the use of baker's washes having an egg white composition.

In response to these health concerns, manufacturers started developing baker's washes which would produce a shine on bakery products, like the egg white composition wash, but which would not contain egg whites. Primarily, these dry formulations employed a protein substitute for the egg white, such as whey, and included additional ingredients necessary to make the whey perform in a manner similar to egg whites. While these protein compositions function very similarly to the egg white composition washes, they do not serve as a medium for microorganism growth in dry powder form. However, these non-egg white composition washes will support microorganism growth when the wash is in a liquid form. The washes must be used within one day of formulation in order to avoid significant microbiological contamination. Consequently, manufacturers produce non-egg white washes in powder form which have a more stable shelf life. Bakeries, then, have to add the powdered product to water to create the wash.

This has led to another problem: the failure of the end user to properly mix the correct proportion of the powder with the right amount of water. For example, in using the non-egg white composition manufactured by the assignee of the present invention, Baker's Bright, Inc., three different proportions of powder are employed based upon different applications. The before oven application for bread or rolls requires 3.25 ounces of the powder composition to be mixed with one quart of warm water (120°–130° F.), the after oven application for bread or rolls requires 2.5–3.25 ounces of the powder composition to be mixed with one quart of warm water. The before oven application for pies requires that 4 ounces of the powdered composition be mixed with one quart of warm water and, optionally, 2 ounces of vegetable oil. These different proportions and preparations of the powder sometimes confuse the baker, resulting in incorrectly formulated wash products and ultimately, bakery products which are less appealing to the consumer. The result is that dry powders are more useful in commercial baking where production formulation controls maintain wash uniformity.

Further, once the composition has been mixed with the warm water, it must set for about one-half hour in order to fully dissolve, obtain a uniform viscosity, and become homogeneous. Failure to permit the wash to set for the full time may result in a partially undissolved product having a lumpy composition which cannot be sprayed and which gives an undesirable appearance, even if brushed on the bakery product, because little or no shine is produced.

There was, therefore, a need for a baker's wash which does not contain any egg white, is ready to use in liquid form, and is shelf stable. By shelf stable, it is meant that the wash is capable of lasting at least 21 days after opening, with proper refrigeration. In effect, a shelf stable baker's wash must meet the minimum microorganism standards required by the FDA, both before and after opening. Once the microorganism level exceeds the minimum FDA requirements, the wash is no longer said to be shelf stable. These problems were effectively addressed by U.S. Pat. No. 4,863,751, Voss, issued Sep. 5, 1989, incorporated herein by reference, which describes a shelf stable ready to use liquid baker's wash composition. These compositions are exemplified as being useful in traditional aerobic packaging for bakery operations. The compositions are easy to apply and provide a desirable sheen to the finished baked product. The compositions are resistant to the growth of gram positive and gram negative bacteria, as well as yeast and mold. The composition utilizes a unique preservative system which comprises a mixture of methylparaben and propylparaben together with a suitable dispersing agent, such as a glycol.

In spite of the success, both technologically and commercially, of the product described in the Voss patent, there is a continuing desire to formulate baker's wash products in an anaerobic-type environment, such as in an aerosol spray. Such products would be very easy to dispense and use. However, packaging the wash composition in an anaerobic, rather than an aerobic, environment makes the composition vulnerable to different types of microorganisms, facultative anaerobic microorganisms, such as gram negative facultative anaerobic rods (Enterobacteriaceae, including Escherichia, Enterobacter and Salmonella), gram positive facultative anaerobic cocci (Micrococcaceae, including Staphylococcus, Enterococcus and Lactococcus) and gram positive facultative anaerobic nonsporulating regular rods (Lactobacillus). Since anaerobic microorganisms function physiologically in an entirely different manner from aerobic microorganisms, many preservative systems which are effective in an aerobic environment are not effective in an anaerobic context, particularly in the neutral pH range. Other preservatives, such as sodium benzoate, sorbates, propionates, sulfites and parabens are used in acidified or alcohol-based products to control microorganisms under aerobic, facultative and anaerobic conditions. However, none of these preservatives are known to function in the neutral product pH range.

Now, it has surprisingly been found that the methylparaben/propylparaben preservative system which is useful for baker's wash compositions in an aerobic context is also effective for use in such compositions in an anaerobic context, particularly in the neutral product pH range.

SUMMARY OF THE INVENTION

The above-described objectives are achieved with the wash of the present invention which contains no egg products, is shelf stable when packaged in an anaerobic environment, remains shelf stable after opening, with refrigeration, and is ready to use after agitating the contents of the wash.

The present invention is anaerobically packaged (such as in an aerosol spray) and comprises a ready to use, shelf stable aqueous wash for providing a shine on bakery products. The composition broadly contains from about 4.9% to about 9% of at least one non-egg white protein, at least one anti-precipitive agent if required by the particular protein used, at least one viscosity control stabilizer, and a neutral pH effective preservative composition. The preservative composition comprises a mixture of methylparaben and propylparaben together with a suitable dispersing agent, such as a glycol.

DETAILED DESCRIPTION OF THE INVENTION

A coating is described for providing a shine on bakery products such as breads, rolls, pie crusts and the like, which is ready to use, contains no egg products, is shelf stable, and also acts as a moisture barrier. The ready to use coating compositions generally comprise from about 4.9% to about 9% non-egg white protein, a specifically-defined neutral pH effective preservative system, an anti-precipitive agent if required by the particular protein used, and a viscosity control stabilizer in an aqueous mixture.

These compositions are packaged and stored in an anaerobic environment using conventional packaging techniques (i.e., in an anaerobic package environment). As used herein "anaerobic environment" recognizes the fact that low levels of oxygen may be present in the product as a result of the packing process (i.e., a facultative anaerobic environment). Thus, "anaerobic environment" includes products which include up to about 3%, preferably up to about 2%, residual oxygen. Examples of such aerosol general anaerobic environments include aerosol sprays using non-foaming nitrogen gas propellant; other propellant blends, such as propane and isobutane and other blends of required hydrostatic pressure ratios, which typically cause foaming during dispensing; or a bag-in-can dispensing system. In the latter, a plastic or multilayered polyester/aluminum foil bag, attached can closure and spraying device, is sealed into the propellent pressurized aerosol container. The composition is injected into the bag, under pressure, through the mechanism of the spraying device. Rather than adding the propellant directly to the composition, as would be done in an aerosol spray, the propellant is in the container that surrounds the bag containing the composition to be sprayed. Aerosol sprays which may be used in the present invention are well-known in the art. Examples of propellants which may be used are discussed above. Nitrogen tends to be a preferred propellant since it minimizes foaming of the composition.

The compositions of the present invention should have pH of at least about 5, preferably from about 5 to about 8, and are more preferably are neutral in pH, having a pH of from about 6 to about 7, most preferably about 7.

The non-egg white protein source of the present invention may contain from about 60% to about 95% protein and may include ingredients of varying protein content such as sodium, calcium or sodium/calcium caseinates, soy proteins (concentrates and isolates), whey proteins, yeast proteins, and mixtures thereof. Any protein concentrate, including corn zein, wheat, rice and other vegetable/grain proteins, as well as animal blood proteins, may be used in the present invention. Preferably, the non-egg white protein source is granular or powdered sodium and/or calcium caseinate which usually has a protein content of from about 80% to about 92%, or whey protein concentrate usually having a protein content of about 75% to about 90%. Sodium caseinate is particularly preferred. The proportion of protein in the protein source is not critical. However, the final ready to use baker's shine composition should have at least about 4.9% (and preferably from about 4.9% to about 9.0%) protein in order to produce acceptable shine characteristics. Preferred compositions contain from about 6.2% to about 7.0%, most preferably about 6.6%, of the protein. The amount of the selected protein source can be adjusted to assure at least such a protein level.

Because caseinates are the preferred protein source, since they are high in protein content, it is contemplated that they will be frequently used as an egg white substitute protein source in formulating the present invention. To prevent coagulation or aggregation of the protein, an anti-precipitive agent is employed. This not only prevents any caseinates from curdling, but also makes the protein from any protein sources more soluble and prevents aggregation and coagulation of the denatured proteins.

The anti-precipitive agents which may be used in the present invention include any of those which are compatible with the protein and the other components utilized in the present composition and which are also suitable for human ingestion. The preferred anti-precipitive agents are those selected from the group consisting of phosphates and polyphosphates, preferably sodium hexametaphosphate, which may be used at a level of from about 0.04% to about 0.12% by weight of the composition. Although phosphates generally may be used as an anti-precipitive agent, disodium phosphates and phosphates or polyphosphates containing calcium should be avoided as they sometimes tend to create precipitation problems. Anti-precipitive agents may also include viscosity control ingredients which maintain physical protein molecule separation. Salt may also be used as an anti-precipitive agent, but at a higher level than defined above.

Viscosity control stabilizers which may be used in the present invention include those which are compatible with the other components contained in the baker's wash compositions and which are suitable for human ingestion. These may include carrageenan, tragacanth gum, xanthan gum, arabic gum, guar gum, carboxymethylcellulose, gelatin, corn syrup solids, maltodextrins, and mixtures thereof. The preferred viscosity control stabilizer is carrageenan, such as Viscarin SD389, commercially available from Marine Colloids Division of FMC Corporation. The amount of viscosity control stabilizer used in the present invention will vary depending upon the desired thickness of the resulting baker's shine composition. The thickness of the composition should be sufficient to maintain the baker's shine composition on the bakery product, but should not be so great as to make the composition difficult to dispense by spraying. The precise amount of viscosity control stabilizer to be included in the composition will largely be determined by the nature of the particular stabilizer being used and the determination of such a suitable level is well within the knowledge of one skilled in the art. It is preferred that the viscosity control stabilizer comprise at least about 0.05%, and preferably from about 0.05% to about 0.30%, by weight of the composition. The precise levels used will depend on the particular ingredients included in the composition.

The preservative system utilized in the present invention comprises generally a mixture of methyl- and propylparabens and at least one glycol or other suitable dispersing agent. Preferably, propylene glycol is employed as a dispersing agent because it also aids in inhibiting both fermentation and mold growth. Other glycols, polysorbates and the like can be employed as the dispersing agent component. The combination of the parabens in the present invention is preferred because it has been found that neither paraben by itself is satisfactory in preventing microorganism growth. Parabens, independently effective in yeast and mold growth at a neutral pH, but are of limited effectiveness against gram negative bacteria. Together, the two parabens control gram negative bacteria, as well as a broad spectrum of facultative anaerobic microorganisms.

The preservative system of the present invention contains methylparaben and propylparaben in amounts such that the relative ratios of the two parabens are at least about 1.25:1, and preferably are in the range of from about 1.25:1 to about 4:1 (methylparaben:propylparaben). The amount of methylparaben in the baker's wash composition is preferably in the range of from about 0.25% by weight to about 0.4% by weight, preferably about 0.4% by weight (based on the total weight of the baker's wash composition). The amount of propylparaben is then selected, based on the amount of methylparaben, so that the mixture falls within the above-described ratio ranges. The amount of propylparaben, therefore, preferably contained is from about 0.1% to about 0.3%, preferably about 0.1% of the baker's wash compositions. The preferable ratio of methylparaben to propylparaben in the composition of the present invention is about 4:1. The combined amount of methylparaben and propylparaben contained in the compositions should be at least about 0.45%.

A dispersing agent is necessary because both parabens are only slightly soluble in water, but are very soluble in glycols, such as propylene glycol, and in polysorbates. The glycols and polysorbates, on the other hand, are very soluble in water. Thus, each component in the neutral pH preservative system performs a necessary task. The dispersing agent used in the present invention need only be present in an amount sufficient to properly effect mixing of the parabens and allow incorporation of the mixture into a food product, i.e., the baker's wash product, although a greater amount may also be used. The preferred preservative composition (i.e., dispersing agent, methylparaben and propylparaben) contains about 80% propylene glycol, about 16% methylparaben and about 4% propylparaben, and is preferably present in the baker's wash composition at a level of at least about 2.25%, preferably about 2.5% by weight.

The baker's wash composition may optionally include one or more coloring agents, pH buffers, or antioxidants which are well known in the art, are commercially available, and would be used at their art-established levels.

The optional coloring agent is preferably selected from the group consisting of caramel, tumeric or, more preferably, carotene, or other artificial or natural yellow "egg" coloring agents. The optional antioxidants may, for example, be selected from BHA, BHT, TBHQ, propyl gallate with citric acid, tocopherols, or the like. Suitable pH buffers, for example, are selected from any of those known in the art which are suitable for use in an edible food composition. The composition may also include aroma enhancers or modifiers (suitable for use in edible products), if desired, to provide the composition with a consumer-preferred aroma when sprayed.

Depending upon the use of the baker's wash composition, suitable vegetable oils, such as, for example, soy bean oil may be incorporated into the composition to improve the shine characteristics and maintain moisture within the bakery product. This would be particularly useful where the baker's wash product is used on a pie crust.

The water used in the present invention may be ordinary tap water having a pH of from about 6 to about 7. Any type of pure treated water can be employed so long as it meets federal clean water standards.

Occasionally, when formulated as a spray, particularly an aerosol spray, the baker's wash composition can become dried out at the nozzle exit, thereby clogging the nozzle and preventing further spray. In some formulations this may happen over time at room temperature, but the condition may be accelerated at elevated bakery temperatures. Further, while smaller nozzle openings (e.g., 13 mm) are frequently preferred for dispensing the baker's wash composition, these smaller openings may also be more prone to clogging than larger (e.g., 16 or 20 mm) openings.

In any event, this clogging can be eliminated by adding low levels of surfactants (food grade), particularly nonionic surfactants to the composition. Particularly preferred are surfactants which additionally act as lubricants and emulsifiers. Examples of such materials include silicone surfactants, alkylene glycols (e.g., propylene glycol), phospholipids (e.g., lecithin), and polysorbate materials. These materials are generally included at levels ranging from about 0.01% to about 5% of the finished composition. Some of these materials (e.g., propylene glycols) are also useful as dispersants for the preservative system, as previously described. When they are used as anti-clogging agents, they are included in the composition at higher levels and serve both functions. These materials are usefully combined with each other and may also be combined with edible oils, such as canola oil, to form effective anti-clog agents. In formulating these anti-clog agents, it is important to test them to make sure they do not adversely affect the shine provided by the finished composition on the baked goods. Examples of anti-clog agents useful in the baker's wash compositions of the present invention include (percentages are of the finished baker's wash composition):

A. Canola Oil (1.0%)+Polysorbate 60 (0.025%)+ Polysorbate 80 (0.012%)

B. Canola Oil (1.0%)+Polysorbate 60 (0.025%)+ Polysorbate 80 (0.012%)+Lecithin (0.5%)

C. Dow Corning FG-10 silicone surfactant (0.010%)+ propylene glycol (3.0%)+Lecithin (0.5%)

D. Dow Corning FG-10 silicone surfactant (0.010%)+ propylene glycol (3.0%)+Canola Oil (1.0%)+

Polysorbate 60 (0.025%)+Polysorbate 80 (0.012%) [optionally also including Lecithin (0.5%)]

E. Dow Corning FG-10 silicone surfactant (0.010%)+propylene glycol (3.0%)+Lecithin (1.0%)

A preferred formulation for the baker's wash composition used in the present invention is as follows:

| Ingredients | Weight % | Pounds |
|---|---|---|
| Water | 90.008 | (1400 gallons) |
| Sodium Caseinate, granular | 7.333 | 950 |
| Preservative system | | 325 |
| Propylene glycol | 2.0 | |
| Methyl paraben | 0.4 | |
| Propylparaben | 0.1 | |
| Sodium hexametaphosphate | 0.0773 | 10 |
| Carrageenin (Viscarin SD339) | 0.059 | 7.65 |
| Beta Carotene | 0.0227 | 3 |
| Total | 100.00% | 12,995 lbs. 1,500 gal. |

All percentages and ratios defined in the present application and in the claims are intended to mean "by weight", unless otherwise specified.

An example of the procedure used to manufacture the present invention, using the ingredients specified above, is as follows:

(1) add the pre-dissolved solution of propylene glycol, methylparaben and propylparaben slowly into agitated warm water (130° F. or above) in blending equipment and mix two minutes until the preservative system is uniformly dispersed;

(2) add sodium hexametaphosphate, the protein source, and other ingredients, and mix until the uniform composition results;

(3) maintain the temperature at about 130° F. or above; and (4) process the final liquid composition with the High Temperature Short Time (HTST) Pasteurization equipment for three minutes at 198°–200° F. and homogenized at 1500 to 2500 psi. Cool the product to ambient temperature (about 55°–66° F.) and package using sanitary procedures known in the art for preventing contamination.

For best results, it is preferred that the preservative composition be added slowly to rapidly agitated warm water. If the composition is added quickly, the preservatives do not uniformly mix and disperse throughout the water. It is also preferred that the water be warm (at least about 130° F.), thus the solubility of the preservative system is increased as compared to the ambient water temperature. Additionally, the warm water aids in more quickly dissolving the protein source than with ambient water.

The final liquid composition may also be batch pasteurized or processed with a combination of batch and HTST or other acceptable pasteurization process procedures. Homogenization is optional, depending upon the source of the protein, the addition of vegetable oil and/or the viscosity control system.

The product produced as described above contains residual air (oxygen) (less than about 3%) from processing to transfer packaging or aerosol container filler.

Aerosol pack procedure:

The product is dispensed into an aerosol can. A sprayer head is inserted into the top of the can and air is flushed from the can with propellant. The can is sealed after being pressurized with propellant to the pressure required to completely evacuate all the product when sprayed.

Bag-in-can pack procedure:

A sprayer head mechanism with an attached plastic or multilayered polyester/aluminum foil laminated pouch is inserted into the can. The can is pressurized around the pouch to a pressure required to completely evacuate the product from the pouch when sprayed. Product is injected under pressure, via the sprayer head mechanism, into the pouch.

Thus, it is apparent that there has been provided, in accordance with the invention, a composition that fully satisfies the objectives set forth above. While the invention has been described in conjunction with specific embodiments thereof, it is evident that many alternatives, modifications and variations will be apparent to those skilled in the art in light of the foregoing description which will facilitate the use of the present invention without departing from its spirit. The present application is intended to cover all of such alternatives, modifications and variations.

What we claim is:

1. A ready to use, shelf stable baker's wash product comprising:

(1) a package; and (2) a baker's wash composition comprising:

(a) at least about 4.9% by weight of at least one non-egg white protein;

(b) an effective amount of at least one anti-precipitive agent to prevent precipitation of said non-egg white protein;

(c) an effective amount of at least one viscosity control stabilizer;

(d) an effective amount of a preservative composition comprising methylparaben and propylparaben in amount such that the ratio of the percent by weight of said methylparaben to that of said propylparaben is greater than about 1.25:1, and an effective amount of at least one dispersing agent sufficient to effect incorporation of said methylparaben and said propylparaben into said baker's wash composition; and (e) water;

said baker's wash composition being contained in an anaerobic environment within said package.

2. The product according to claim 1 wherein the amount of said protein is from about 6.2% to about 7.0% by weight of said baker's wash composition.

3. The product according to claim 2 wherein the amount of said protein is about 6.6% by weight of said baker's wash composition.

4. The product according to claim 1 wherein said protein is provided by at least one compound selected from the group consisting of sodium calcium caseinate, sodium caseinate, calcium caseinate, whey protein, yeast protein, soy protein concentrates and isolates, and mixtures thereof.

5. The product according to claim 4 wherein said protein is provided in the form of sodium caseinate.

6. The product according to claim 1 wherein said anti-precipitive agent is selected from the group consisting of salt, phosphates, polyphosphates, and mixtures thereof.

7. The product according to claim 6 wherein said anti-precipitive agent is sodium hexametaphosphate.

8. The product according to claim 7 wherein the amount of said sodium hexametaphosphate is from about 0.04% to about 0.12% of said baker's wash composition.

9. The product according to claim 1 wherein said viscosity control stabilizer is selected from the group consisting of carrageenan, tragacanth gum, xanthan gum, arabic gum, guar gum, carboxymethylcellulose, gelatin, corn syrup solids, maltodextrins, and mixtures thereof.

10. The product according to claim 9 wherein said viscosity control stabilizer is carrageenan.

11. The product according to claim 10 wherein the amount of said viscosity control stabilizer is at least about 0.05% by weight of said baker's wash composition.

12. The product according to claim 1 wherein said preservative composition comprises about 80% by weight propylene glycol, about 16% by weight methylparaben, and about 4% by weight propylparaben.

13. The product according to claim 1 wherein said baker's wash composition contains about 0.1% propylparaben and about 0.4% methylparaben.

14. The product according to claim 1 wherein said baker's wash composition additionally comprises vegetable oil.

15. The product according to claim 1 which is formulated in the form of an aerosol spray.

16. The product according to claim 1 wherein the preservative composition comprises at least about 2.25% by weight of said baker's wash composition.

17. A ready to use, shelf stable baker's wash product comprising:

(1) a package; and
(2) a baker's wash composition comprising:
   (a) an amount of at least one caseinate sufficient to provide a protein content of at least about 4.9% by weight protein;
   (b) an effective amount of sodium hexametaphosphate to prevent the precipitation of said caseinate;
   (c) an effective amount of a carrogeenan to render said baker's wash composition sufficiently viscous to prevent the runoff of said composition from a bakery product;
   (d) an effective amount of a preservative composition comprising propylene glycol, methylparaben, and propylparaben wherein the ratio by weight of methylparaben to propylparaben is about 4:1 and wherein the amount of said propylene glycol is sufficient to effect the incorporation of said methylparaben and propylparaben into the baker's wash composition; and
   (e) water;
said baker's wash composition being contained in an anaerobic environment within said package.

18. The product according to claim 17 formulated as an aerosol spray.

19. The product according to claim 18 wherein said methylparaben is present in an amount equal to about 0.4% of said baker's wash composition and wherein said propylparaben is present in an amount equal to about 0.1% of said baker's wash composition.

20. The product according to claim 1 having a pH of at least about 5.

21. The product according to claim 20 having a pH of from about 6 to about 7.

22. The product according to claim 17 having a pH of from about 6 to about 7.

* * * * *